US005598630A

United States Patent [19]

Savoyard et al.

[11] Patent Number: 5,598,630

[45] Date of Patent: Feb. 4, 1997

[54] METHOD OF DESIGNING FAMILY OF DOHC CYLINDER HEADS

[75] Inventors: James P. Savoyard, Fairhaven; Andrew T. Mueller, Richmond; James R. Klotz, Mt. Clemens, all of Mich.

[73] Assignee: Chrysler Corporation, Auburn Hills, Mich.

[21] Appl. No.: 515,178

[22] Filed: Aug. 11, 1995

[51] Int. Cl.$^6$ .................................................. B23P 15/00

[52] U.S. Cl. ................................. 29/888.06; 29/888.01

[58] Field of Search ........................ 29/888.06, 888.01; 123/90.31, 90.17, 193.5, 193.1

[56] References Cited

U.S. PATENT DOCUMENTS

| | | | |
|---|---|---|---|
| 4,157,607 | 6/1979 | Ernest | 29/888.06 |
| 4,831,975 | 5/1989 | Yoshimoto et al. | 123/90.31 |
| 5,111,782 | 5/1992 | Mezger | 123/90.31 |
| 5,181,485 | 1/1993 | Hirose et al. | 123/90.17 |
| 5,333,581 | 8/1994 | Cagle | 29/888.06 |
| 5,458,099 | 10/1995 | Koll et al. | 29/888.06 |

FOREIGN PATENT DOCUMENTS

| | | |
|---|---|---|
| 3-107534 | 5/1991 | Japan . |

*Primary Examiner*—Irene Cuda
*Attorney, Agent, or Firm*—Kenneth H. MacLean

[57] ABSTRACT

During engine development of a family of cylinder heads with a common casting, common camshaft drive gears and common valve sizing changes in valve configuration, particularly in the included angle, is readily and inexpensively carried out by the subject method of design applied to DOHC cylinder heads.

2 Claims, 1 Drawing Sheet

METHOD OF DESIGNING FAMILY OF DOHC CYLINDER HEADS

BACKGROUND OF THE INVENTION

1. Field of the Invention

This application concerns a method for designing a family of DOHC (dual overhead camshaft) type cylinder heads for an internal combustion engine, each with different included angles between the intake and exhaust valves but utilizing a common casting, common valves, and common camshafts. More particularly, the family of cylinder heads has a camshaft drive apparatus including a pair of gears, one on the end of each camshaft, and a third driven gear which meshes with the other gears. Within the family of cylinder heads, the included valve angle is varied by the relatively simple process of changing the spacing between the camshafts and accommodating the resultant change in spacing between the camshaft mounted gears by shifting the axis of the driven shaft with respect to a plane extending through the two camshafts.

2. Description of the Related Art

Engine cylinder heads having dual overhead camshafts commonly rotate the camshafts by belts, chains, or gears. Often a combination of belts, chains, or gears is used. It is known to mount a gear on the end on each of the camshafts and to use another gear to drive the camshaft mounted gears. In a typical development phase for an engine, several cylinder heads are created and tested. These cylinder heads have different included angles between the intake and the exhaust valves. Previously, this was accomplished by moving camshafts laterally and/or vertically and accommodating these changes by providing different sized valves, different sized gear sets, and sometimes different camshafts. This process is very costly and time consuming as these components must be custom designed and ordered.

SUMMARY OF THE INVENTION

This application concerns a design method or process to develop a family of DOHC cylinder heads with differing included angles between the intake and exhaust valves but utilizing a common cylinder head casting, common valves, and common camshafts. The camshaft drive utilizes a gear on the end of each of the camshafts. A third gear meshes with the gears on the camshafts. The included angle between the gears is readily changed by lateral displacing the camshafts. The resultant increase or decrease in spacing between the gears on the camshaft is accommodated by moving the axis of the driven gear towards or away from the plane extending through the axes of the camshafts. Further, a sprocket is attached to the third gear which is rotatably engaged by a drive belt which also engages a sprocket on the engine's crankshaft. Changes in the included angle obviously require a different sized belt. However, these belts are available in many lengths at reasonable cost.

In summary, the subject method of designing a family of DOHC cylinder heads is extremely flexible and relatively inexpensive. By varying only components such as drive belts, it is unnecessary to provide different gear sets, valves, or camshafts.

DESCRIPTION OF A PREFERRED EMBODIMENT

Figure 1:
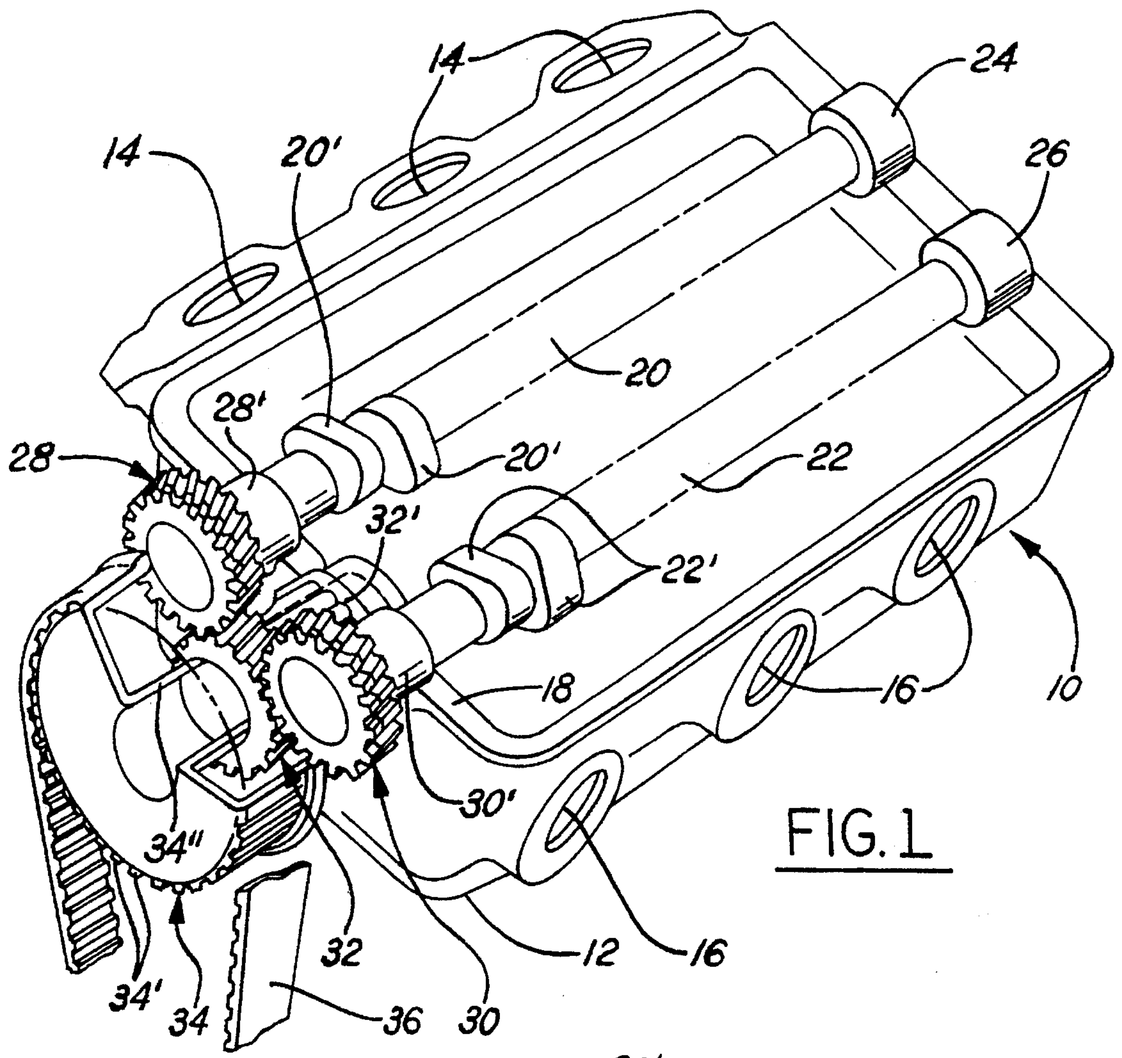
FIG. 1 is a perspective view of a dual overhead camshaft-type cylinder head and valve train drive mechanism.

In FIG. 1, an engine cylinder head 10 is illustrated having a lower or bottom planar surface 12 adapted to be mounted against an upper surface of an engine block (not shown). The illustrated cylinder head is for a three cylinder engine or one bank of a V-6. It has three intake ports 14 and three exhaust outlets 16. The upper surface 18 of the cylinder head is adapted to support a valve cover (not shown).

The cylinder head supports an intake camshaft 20 and an exhaust camshaft 22, mounted in parallelism to one another. The camshafts 20, 22 are spaced laterally from one another and each includes cam lobe portions 20', 22' respectively (not all the lobe portions are illustrated). The lobe portions are adapted to engage the upper ends of valves which are positioned next to the lobes. Camshafts 20, 22 have rearward journal portions 24 and 26 supported by the upper portion of the cylinder head 10. Likewise, camshafts 20, 22 have forward end journal portions (opposite end from portions 24, 26) which are supported by the upper portion of the cylinder head 10.

A hub portion 28' of a gear 28 is operably attached on to the forward (left) end portion of the camshaft 20. Likewise, a hub portion 30' of a gear 30 is operably attached on to the forward (left) end portion of camshaft 22. The camshaft spacing is great enough relative to the diameters of gears 28, 30 so that they do not engage one another and are spaced relatively far apart. However, gears 28, 30 each mesh with a third gear 32 which is located below a plane extending through the axes of camshafts 20, 22. The third gear 32 has a hub portion 32' which extends rearwardly into a bearing support portion of the cylinder head 10. In the illustrated specific embodiment, hub portion 32' is supported by a plurality of roller bearings some of which are shown just to the left of the leader for numeral 32'.

The gear 32 is operably attached to a sprocket 34 by a hub portion 34" which in turn is engaged by a flexible belt 36. Belt 36 also engages a sprocket (not shown) on the crankshaft of the engine. Sprocket 34 has a periphery of tooth profiles 34' which engage corresponding tooth profiles on the flexible drive belt 36.

METHOD OF DESIGNING A FAMILY OF DOHC CYLINDER HEADS

Figure 2:
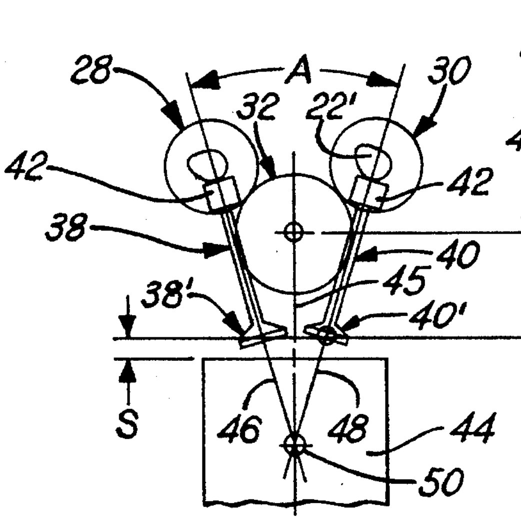
FIG. 2 is an elevational and somewhat schematic view of one cylinder head of a family of cylinder heads illustrating a first design displaying a relatively close spacing between the intake and exhaust camshafts and a resultant small included angle between intake and exhaust valves.
Figure 3:
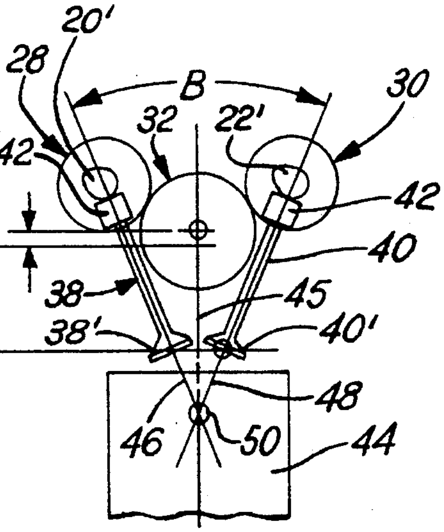
FIG. 3 is a view similar to FIG. 2 showing a second cylinder head of a family of cylinder heads illustrating a second design displaying increased spacing between the intake and exhaust camshafts and a resultant larger included angle between intake and exhaust valves.

FIGS. 2 and 3 schematically illustrates the valve geometry of two of a family of DOHC type cylinder heads which could be developed using a common head casting, common valves, and common camshafts. The camshaft driving arrangement is schematically shown for two different valve inclinations and camshaft placements. FIG. 2 shows a cylinder head with a pair of relatively closely spaced camshafts resulting in a relatively narrow included angle A between intake and exhaust valves. An intake valve 38 having an enlarged head portion 38' is shown. Likewise, exhaust valve

40 having an enlarged head portion 40' is shown. The upper ends of the valves 38 and 40 each engage a tappet assembly 42. The assemblies 42 are supported by the cylinder head for reciprocal movement as is common in engine design. As the camshafts rotate, lobes 20', 22' engage respective tappet assemblies 42 to operate the valves.

As is common in internal combustion engine design, a piston 44 is located in a cylinder bore below valve heads 38' and 40'. In FIGS. 2 and 3, the piston 44 is shown near its top dead center position and is spaced a distance "S" below the mid-portion of closed valves 38, 40. The axis 46 of valve 38 and the axis 48 of valve 40 intersect at point 50 and extend at an included angle "A" with respect to one another. The included angle is varied during design of an engine as different arrangements can vary operative parameters of the engine.

The included valve angle is an important aspect of engine design. During the design and development of any particular engine or engine family, it is very likely that it will be desirable to vary the included valve angle. For many reasons, a narrow included angle A as illustrated in FIG. 2 is desirable. However, sufficient space between the valves must exist for a sparkplug. Also, the combustion chamber's entire upper surface configuration may necessitate a change in the included valve angle. Therefore, it is highly desirable to provide a valve design and camshaft drive that readily permits changing the included valve angle. In simpler terms, it is desirable to provide an arrangement where the spacing between the intake and exhaust camshafts can be modified without totally redesigning the cylinder head or requiring new components such as a new (different sized) gear set, or new valves, or new camshafts.

In FIGS. 2 and 3, the same cylinder head casting can be utilized, the same gear set 28, 30, and 32 used, and the same valves 38, 40 used. However, in FIG. 3, the lateral spacing of the camshafts is significantly increased and this increases the included valve angle from smaller angle A to a greater angle B. The increase in camshaft spacing increases the spacing between gears 28, 30. This is accommodated simply by moving the axis of gear 32 upward toward the plane extending through the axes of the camshafts. Resultantly, the same camshafts, the same gears 28, 30, and 32, and the same valves 38, 40 are utilized. Of course, upward movement of the axis of gear 32 necessitates a different drive belt. However, this component is readily available in different lengths and is also relatively inexpensive. In any event, the change in spacing between the camshafts is relatively slight for any given large change in the included valve angle. By using the subject design method, cylinder head development is greatly enhanced at a moderate cost.

Although only two design modifications of the family of cylinder heads is illustrated, other modifications will be readily apparent to one skilled in the art and the inventive design method is as claimed hereinafter.

We claim:

1. The method of designing a family of DOHC cylinder heads for an internal combustion engine, the family having common valves, base casting, and camshafts but having different lateral spacing between camshafts to create different included angles between the row of intake valves and the row of exhaust valves, the designing method comprising: providing a gear on one end of each of the camshafts so that the peripheries of these gears are spaced in non-meshing relationship with each other; providing a third gear rotative about an axis so that it is in meshing relationship with the camshaft carried gears; changing the lateral spacing between the camshafts from one of the family of cylinder heads to another for changing the included angle between the intake and the exhaust valves; and adjusting the axis of the third gear in a direction substantially normal to a plane including the two camshafts to accommodate the change in lateral spacing between peripheries of the camshaft carried gears.

2. The method of designing the family of cylinder heads as set forth in claim 1 and further comprising: attaching sprocket means to the third gear; selecting an appropriately sized drive belt for engagement with said sprocket means to transmit rotative energy to the repositioned third gear.

* * * * *